United States Patent [19]

Gibson

[11] 4,364,119
[45] Dec. 14, 1982

[54] VIDEO DISC PLAYER WITH RFI REDUCTION CIRCUIT INCLUDING A SIGNAL PRODUCT GENERATOR

[75] Inventor: John J. Gibson, Princeton, N.J.
[73] Assignee: RCA Corporation, New York, N.Y.
[21] Appl. No.: 208,982
[22] Filed: Nov. 21, 1980
[51] Int. Cl.³ .............................................. H04N 5/80
[52] U.S. Cl. .................................. 369/126; 360/38.1; 455/303; 358/167; 358/340
[58] Field of Search .................... 360/38, 33; 369/126, 369/129; 358/128.5, 127, 167; 455/308, 305, 304, 303

[56] References Cited
U.S. PATENT DOCUMENTS 2,996,576 8/1961 Dolby ..................................... 360/38
3,893,168 7/1975 Bechly .................................... 360/25
4,021,852 5/1977 Hurst ..................................... 360/64
4,203,134 5/1980 Christopher .......................... 358/8

Primary Examiner—Alan Faber
Attorney, Agent, or Firm—Eugene M. Whitacre; Joseph S. Tripoli; William H. Meise

[57] ABSTRACT

Under certain conditions a video disc player can be responsive to externally applied interference signals to provide a defect in the display of the information recovered from the disc. Apparatus is provided between the pickup circuits and the normal defect compensation apparatus of the player to detect the presence of the external signals and to activate the normal defect compensation apparatus. The apparatus includes a product generator which multiplies the combined extraneous signal and normally recovered signal with an amplitude limited version of the same signal in order to enhance the probability of detection of extraneous signals even when the amplitude thereof is small relative to the normally recovered signal.

9 Claims, 5 Drawing Figures

VIDEO DISC PLAYER WITH RFI REDUCTION CIRCUIT INCLUDING A SIGNAL PRODUCT GENERATOR

The present invention relates generally to video disc players and more particularly to video disc players having radio frequency interference reduction apparatus.

In certain types of video disc players, such as, for example, capacitive pickup video disc players, the signal pickup circuitry includes an oscillator operating in conjunction with a tuned circuit and a peak detector. An example of such pickup circuitry may be found in U.S. Pat. No. 4,080,625 issued to H. Kawameto et al. on Mar. 21, 1978. The oscillator frequency in such systems is generally set at a value falling within the ISM (industrial, scientific, medical) allocation band, for example, 915 MHz. The power output of this oscillator at 915 MHz is usually low and does not generally represent a significant problem in terms of r.f. radiation outward. However, there are certain types of equipment which operate at high power levels in the ISM band, such as radars for example, and, if a number of conditions are met (such as frequency, power level, directivity and location, etc.) these outside sources of radiation can have an adverse affect on the playback operation of the video disc system.

This undesirable mode of operation appears to manifest itself in the following way. When an outside source is radiating at levels which are higher than those anticipated by the pickup circuit detector in normal player operation, the extraneous detected output signal is supplied to an FM detector which locks onto the extraneous signal. The extraneous signal is then demodulated and passed through the player signal processing circuits and displayed on the television receiver. If the extraneous signal is a pulse of short duration, say two microseconds, then the demodulated version may appear on the output television display as a short interval of black or white on a horizontal line. This results from the fact that in FM systems of the type under consideration detection of high carrier frequencies is decoded as tending toward "white" level signals and detection of low carrier frequencies is detected as tending toward "black" level signals. These short duration interference signals may be noticeable to the discerning eye.

When the external source is of greater duration, say 125 microseconds, the effect is much more noticeable in the output display. Since one television horizontal line in the NTSC format is about 63 microseconds long, a condition may arise wherein two lines of the display will be white or black. Now if the outside source is a periodic type source, then two lines of the display will show up incorrectly on a corresponding periodic basis. This is noticeable even more than the previously mentioned situation.

There are various combinations of outside source power levels and duration which may produce other undesirable results in the final display such as a combination of light and dark spots on one or more horizontal lines of the display and even picture rolling if the FM demodulator falsely locks on to an extraneous signal when the vertical synchronization signal should normally be detected. In respect of all of the above identified display problems, it is desirable to provide a means to at least reduce the effects of the interference to a level which most observers would not even notice. Again, it should be noted that the problems mentioned arise only under a certain set of conditions.

In a patent application filed on Nov. 7, 1980 in the names of F. B. Lang and J. K. Clemens, Ser. No. 204,828, which issued as U.S. Pat. No. 4,327,432 on Apr. 27, 1982, a solution to the above situation is presented.

The Lang et al. invention provides a means for reducing the affects of outside radio frequency interference (RFI) in the operation of a video disc player of the type which includes a pickup circuit means coupled to an FM demodulator. The FM demodulator passes the FM detected signal to a defect compensation means which includes a defect switch and a delay line. The FM demodulator is also coupled to a defect detector which senses normal defects, that is, when the FM carrier deviation is beyond certain deviation limits. The normal operation of the defect compensation means is to recirculate and reprocess a previous line of demodulated information when the defect detector operates the defect switch. In accordance with the Lang et al. invention, a radio frequency interference reduction circuit is connected between the output of the pickup circuit means and the defect switch. The RFI reduction circuit, in one embodiment, comprises an amplifier, coupled to a detector, which in turn is connected to two conduction paths. The two conduction paths are connected to a differential signal comparator circuit. One of the two paths is a wideband path and the other path includes a low pass filter which does not pass abrupt changes in the signal provided at the output of the pickup circuit. Either one of the paths may have a d.c. offset voltage applied thereto. The net effect is that the differential input to the comparator provides an output in response to rapid amplitude variations in the output signal of the pickup circuit. When such a situation is detected, the comparator provides a signal to the defect switch, through an OR circuit to cause recirculation of a previously detected line of information for the duration of the detected defect. The OR circuit is used so that the recirculation may be accomplished for either the abnormal carrier deviations caused by disc defects or the abnormal occurrence of a detected extraneous outside signal.

Another patent application was filed on Nov. 7, 1980 in the names of C. B. Dieterich and F. B. Lang, Ser. No. 204,827, which issued as U.S. Pat. No. 4,327,431 on Apr. 27, 1982, wherein a system of the Lang et al. type was presented with the addition of a variable offset voltage in one of the two paths.

Yet another approach to the above situation is described in a patent application filed in the name of J. K. Clemens concurrently herewith.

In accordance with the Clemens' approach, RFI reduction circuitry is placed between the pickup circuits and the defect compensation apparatus just as in the Lang et al. case and the Dieterich et al. case. However, in the Clemens case, an amplifier is connected between the pickup circuits and first and second conductive paths. The first conductive path includes a limiter. A subtractive signal combiner means is connected to the first and second paths to provide a signal corresponding to the difference between the signals on the first and second paths. The subtractively combined signal is coupled to a peak detector and the output of the peak detector is coupled to the defect compensation apparatus. When an extraneous signal is present in the signal from the pickup circuits, the effect of the overall circuit arrangement is to diminish the amplitude of the normally recovered modulated carrier relative to the extraneous signal to thereby make detection of the extraneous signal easier and more reliable. This is especially important where the extraneous signal is close in amplitude or even smaller in amplitude than the amplitude of the modulated carrier signal.

For satisfactory operation of the Clemens invention the amplitude of the carrier at the output of the limiter should be balanced to be substantially equal to the amplitude level of the carrier on the second path.

The present invention takes an approach similar to that of Clemens but is much less sensitive to the balancing between the two conductive paths. In accordance with the present invention the RFI circuitry is connected between the pickup circuit means and the defect switch just as in all of the previously mentioned approaches. The present RFI reduction circuit comprises an amplifier responsive to the output signals from the pickup circuits and first and second conductive paths are connected to an output terminal of the amplifier. The first conductive path includes a signal limiter. The output terminal of the limiter and the second conductive path are connected to a product generation means. A filter means is responsive to the product signals generated to provide a filtered signal. The filtered signal is detected and provides a signal indicative of the influence of the extraneous signal. Means are provided for coupling the detected signal to the defect compensation apparatus.

A detailed description of a preferred embodiment of the present invention is shown in the drawing in which.

Figure 1:
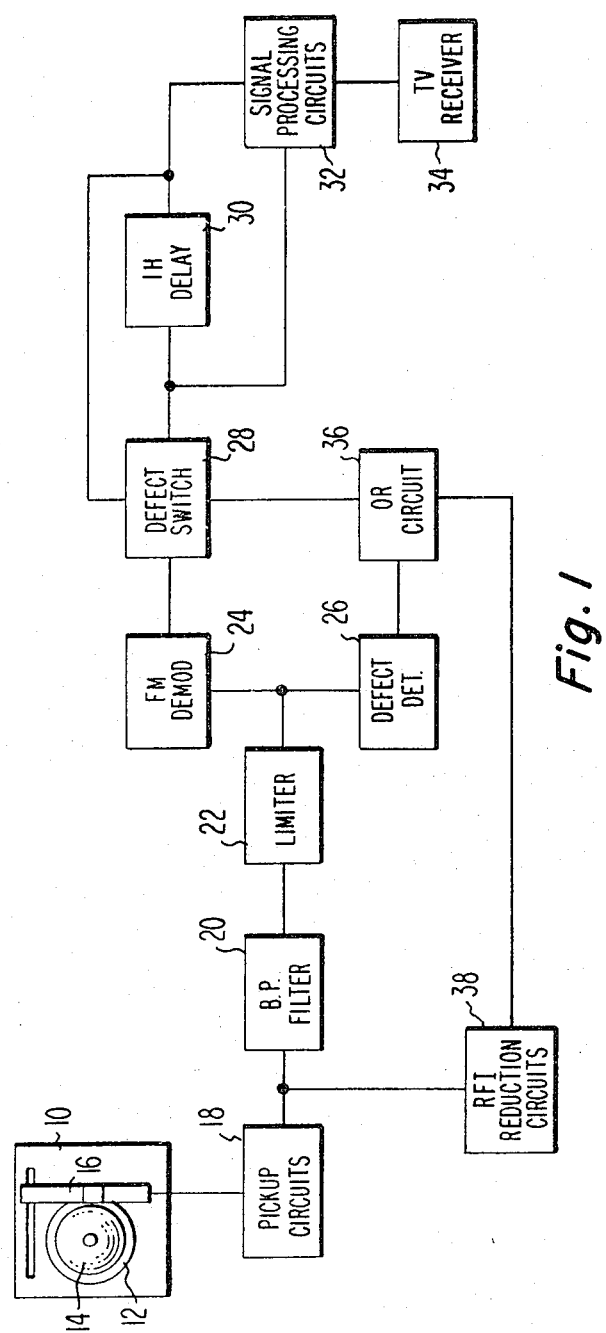
FIG. 1 is a block diagram representative of a video disc player including an RFI reduction circuit.

In FIG. 1, a video disc player 10 is shown including a turntable 12 for supporting a video disc record 14 of the capacitance type. The player 10 also includes a carriage 16 which carries a pickup cartridge therein. Typically, the carriage moves in a timed relation to the speed of rotation of turntable 12 during playback.

Electrically coupled to the cartridge in the carriage 16 are the pickup circuits 18 of the general type described in the Kawamoto patent. Although shown as a box separated from the carriage 16, these circuits are preferably housed in the carriage. As described in Kawamoto, the output signal from pickup circuitry 18 is a frequency modulated signal. This signal is bandpass filtered at 20. The signal at the output of filter 20 corresponds to the video information recorded on the disc. The video is recorded on a 5 MHz carrier with the black level causing zero deviation, sync tips at 4.3 MHz deviation and peak white at 6.3 MHz deviation. The FM audio carrier is at 716 KHz with a deviation of plus and minus 50 KHz. For purposes of discussing the present invention, only the video signal path will be considered and thus the bandpass filter 20 only passes the video frequencies of interest. The video signal is limited in limiter 22 to provide an appropriate signal to the FM demodulator 24 and defect detector 26.

FM demodulator 24 is a phase-locked-loop type and defect detector 26 is a latching comparator type. Both of these devices are of the type disclosed in U.S. Pat. No. 4,203,134 issued to T. J. Christopher et al. on May 13, 1980. The Christopher et al. patent also describes the function and operation of the defect switch 28, the 1H delay line 30 and the signal processing circuits 32 for providing a signal for display on the TV receiver 34. For an even more detailed description and explanation of the function and operation of elements 30 and 32 reference should be made to U.S. Pat. No. 4,195,309 issued to T. J. Christopher et al. on Mar. 25, 1980.

In general terms, the circuit of FIG. 1 thus far described performs as follows. The pickup circuits 18 provide a frequency modulated signal which is filtered at 20 to develop the video FM signal which is then limited at 22. In the FM demodulator 24, the phase of the recovered signal is compared to that of a voltage controlled oscillator (VCO) to develop a signal which when low pass filtered provides a demodulated version of the video information. The defect detector 26 compares the recovered signal with the output of the VCO in the demodulator 24 and when the phase of the recovered signal is out of a certain range relative to the VCO signal, a defect indication pulse is generated and provided through circuitry which includes an OR function 36. A defect signal coupled via the OR circuitry 36 is used to operate the defect switch 28. When operated, switch 28 causes information signals which were previously recovered to be re-used by passing signals coupled from the output of the 1H delay line 30. The recirculation or re-use of previously recovered information continues for as long as the switch 28 is held in the re-use position.

The arrangement of FIG. 1 further comprises a radio frequency interference reduction apparatus 38 which may comprise several circuit functions. RFI reduction apparatus 38 is electrically connected between the output terminal of the pickup circuits 18 and an input terminal of the OR circuit 36. Apparatus 38 could be connected to the output of filter 20 since the filtered signal includes the information used in the operation of the RFI reduction scheme. Apparatus 38 is used to detect anomalous signals from outside sources, as discussed above, and develop an appropriate signal which will activate the defect switch 28, via the OR circuit 36. By so doing, apparatus 38, in cooperation with the other elements mentioned, causes previously recovered information to be recirculated through switch 28 so that instead of seeing white or black lines appearing across the display, something more like that which should appear will be displayed. In most cases, the substitution of one line or less as described above cannot be noticed by the general observer. Even the substitution of the same line twice in a sequence, which is on the order of a 125 microsecond defect, is barely noticeable to most observers.

It will be recalled that the output signals from the defect detector 26 and the RFI reduction apparatus 38 are OR'ed at 36. It is desired to have the normal defect detection and substitution take place in the usual fashion so that out of band deviations due to signal defects are handled in the usual way. At the same time, when an outside signal gets picked up the system should see this and respond with a substitution recirculated through switch 28.

A problem in detection can possibly arise when the extraneous signal or pulse has an amplitude which is on the order of or smaller than the amplitude of the normally recovered modulated carrier. Under these conditions, it can be difficult to decide when the extraneous pulse, which may be thought of as a sinusoidal signal added to the video FM carrier for the duration of the pulse, is present and corrective action in the form of signal substitution should be taken.

Figure 2:
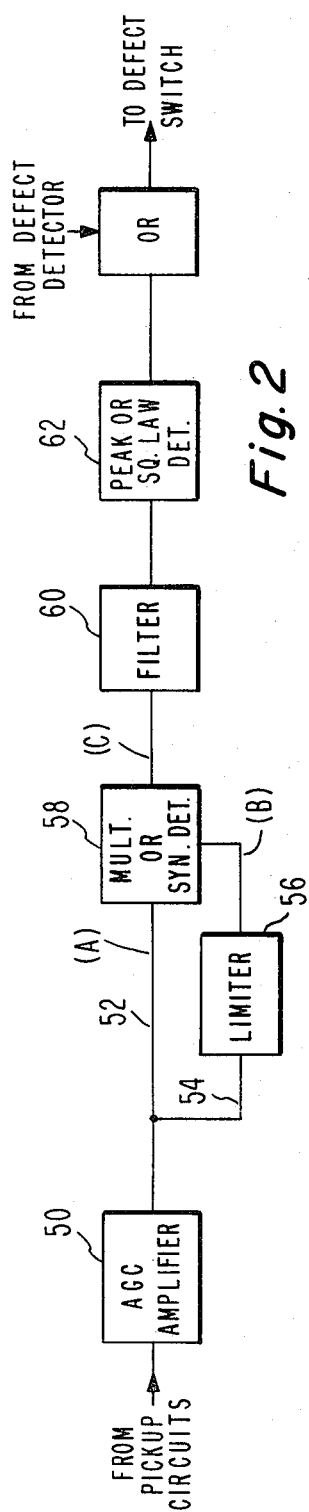
FIG. 2 is a block diagram of the RFI reduction circuit in accordance with the present invention.
Figure 3A:
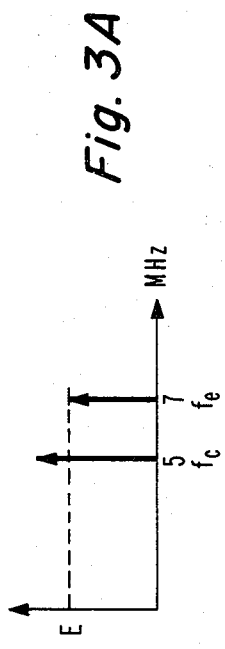
FIGS. 3A, 3B and 3C are spectral diagrams helpful in understanding the present invention.
Figure 3B:
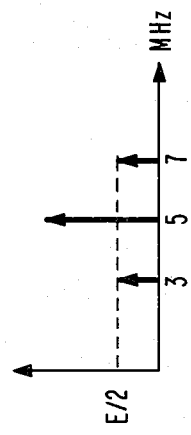

A means for solving the above noted problem is shown in FIG. 2 and will be explained in conjunction with an example shown graphically in FIGS. 3A-3C.

In FIG. 2, the signal provided at the output of the pickup circuits 18 is applied to a gain controlled amplifier 50. It is desirable to use an AGC amplifier at this point because the normal variations of the output signal from the pickup arm may span the range of 50 millivolts to 1.2 volts depending upon a number of factors. Amplifier 50 will tend to smooth out these variations.

Connected to the output terminal of amplifier 50 are two conductive paths, 52 and 54. Path 54 includes a limiter circuit 56. In the example, the modulated carrier is at 5 MHz and the extraneous pulse has a frequency of 7 MHz and an amplitude of E. The spectrum of FIG. 3A represents the signals on path 52. Note that the carrier is at a higher amplitude level than the extraneous signal. These signals are applied to the input terminal of the limiter 56. In the time domain, the signal of 3A would look like an FM signal (with some residual AM components around the horizontal and vertical sync times) until the occurrence of the 7 MHz external pulse. At this time the temporal signal appears as an FM signal with an amplitude modulated envelope.

The limiter 56 is of the type which has high gain and adjustable limit levels. These levels can be set so that the carrier level at the output terminal of the limiter 56 is substantially equal to the amplitude level of the modulated carrier on path 52. It will be shown herein that this balance is not significantly important in the operation of the present invention. As is well known and can be shown mathematically the nature of the limiter action when working on FM signals is to generate a symmetrical spectrum about the carrier. Thus, the limiter action creates a further signal component in the spectrum at 3 MHz and the amplitude of the original 7 MHz extraneous signal is reduced to one-half its former value and the amplitude of the further signal is at the E/2 level. The signals having the spectrum of FIG. 3B appear at the output terminal of the limiter 56. In the time domain, this signal appears as a square wave with transitions at the zero crossovers of the time version of 3B.

Now, the signals having the spectrum of 3A and the spectrum of 3B, corresponding to the signals on line 52 and the output terminal of limiter 56, are multiplied together at 58. Element 58 is preferably a synchronous detector but may take the form of any signal multiplier. The important point is that the signals coming into 58 are multiplied together.

Figure 3C:
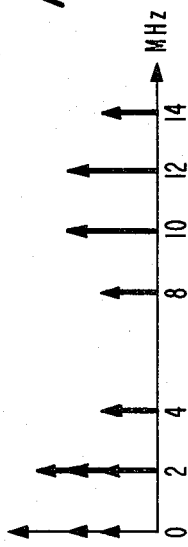

In FIG. 3C the results of this multiplication or product generation are shown in the frequency spectrum for the example under consideration. When two signals are multiplied together, or synchronously detected, components are generated at the sum and difference frequencies of the original two signals. Ignoring a vigorous treatment of amplitude levels, it will be seen that the product of the 5 MHz carriers of 3A and 3B generates a D.C. component at 0 MHz and a component at 10 MHz. The product of the 5 MHz carrier of 3B with the 7 MHz extraneous signal gives components at 2 MHz and 12 MHz. The product of the 3 MHz further signal of 3B with the 5 MHz and 7 MHz signals of 3A gives components at 2 MHz, 8 MHz, 4 MHz and 10 MHz. The product of the 7 MHz signal of 3B with the 5 MHz and 7 MHz signals of 3A give components at 2 MHz, 12 MHz, 0 MHz and 14 MHz. All of these components are shown in 3C. In the time domain the signal of 3C appear as a full wave rectified version of the temporal version of the 3A signal. It should also be noted that the difference frequency of the product of the 3A, 7 MHz signal and the 3B, 7 MHz signal is a quasi-d.c. component at zero MHz. This quasi-d.c. component exists only for the duration of the extraneous pulse.

FIG. 3C clearly shows the result of using a product generator. The carrier frequency has been moved away from the 5 MHz location. Now by judicious filtering at 60 a signal can be isolated which clearly carries the influence of the presence of the extraneous signal and very little influence of the carrier signal. Filter 60 is arranged to high pass signals above a small frequency so as to get rid of the D.C. components at 0 MHz and to low pass signals below the 5 MHz level. The low pass function also eliminates high order even harmonics resulting from the multiplication process.

In the example under consideration, all of the components mentioned above and falling above 0 MHz and below 5 MHz were generated as a result of the existence of the 7 MHz extraneous signal provided at the output of the amplifier 50. Therefore, if the extraneous signal is not present the possibility of false detection is small. The other point to be noted is that the filtered signal has energy content resulting from the extraneous signal presence and this energy content is not substantially influenced by the carrier amplitude level. Thus, the ability to detect the influence of extraneous signals of relatively low level compared to the carrier level is increased by the process.

It will be understood that the example presented is in ideal terms. Whenever signals having multiple frequency components are multiplied together, many cross product terms are generated. Of course, the higher order terms have generally smaller amplitude components as compared to the primary product terms and therefore although there may be a filling in of small components in the spectrum of the signal provided at the output of filter 60 in an actual case, still the benefits of the present arrangement will be evident. In the time domain, the signal at the output of filter 60 will look like the envelope of the incidental amplitude modulation until the time of occurrence of the extraneous pulse. Now, the filtered signal looks like the envelope of the undesired signal summed with the envelope of the normal signal.

The signal provided by filter 60 is coupled to a detector 62 which may be a peak detector or a square law detector. If the detector utilizes a threshold device to distinguish between the normal signal and the extraneous signal, then, in the time domain, the detected signal will look like a pulse having a duration corresponding to the time the extraneous signal exceeds the threshold level. The detected signal is then coupled via the OR circuit 36 to the defect switch 28. Should an extraneous, unrecorded signal appear at the output terminal of the pickup circuits 18, even if the extraneous signal is small relative to the main modulated carrier level, the RFI reduction arrangement of the present invention will be able to detect the influence of that signal and corrective action can be taken.

What is claimed is:
1. In a video disc player of the type having:
   pickup apparatus for recovering an information signal recorded on a disc in the form of a modulated carrier signal; demodulation apparatus coupled to said pickup apparatus for demodulating said modu- lated carrier, defect detection apparatus coupled to said pickup apparatus for detecting defects in the recovered signal; and defect compensation apparatus coupled to said demodulation apparatus and to said defect detection apparatus and responsive to the operation of the defect detection apparatus for providing a substitute signal in place of the recovered signal in the playback display of said information signals during occurrences of defects in the recovered signal; said player being subject to interference with normal playback display operations due to the pickup of unrecorded, externally applied signals; apparatus for reducing the influence of said external signals comprising:

amplifier means connected to said pickup apparatus;

first and second conductive paths responsive to the signals provided by said amplifier means, said first conductive path including a signal limiter;

product generation means responsive to the signals on said second path and to the signals provided by said limiter for providing a signal corresponding to the product of the signals applied thereto;

filter means responsive to said product signal for providing a filtered signal;

signal detector means responsive to said filtered signal for providing a detected signal indicative of the influence of the extraneous signal present at the output of said pickup apparatus; and means for coupling the detected output signal to said defect compensation apparatus.

2. The apparatus according to claim 1 wherein said product generation means comprises a synchronous detector.

3. The apparatus according to claim 2 wherein said signal detector means comprises a square law detector.

4. The apparatus according to claim 2 wherein said signal detector means comprises a peak detector.

5. The apparatus according to claim 4 wherein said amplifier means comprises an automatic gain controlled amplifier.

6. In a video disc player of the type having:

pickup apparatus for recovering an information signal recorded on a disc in the form of a modulated carrier signal; demodulation apparatus coupled to said pickup apparatus for demodulating said modulated carrier, defect detection apparatus coupled to said pickup apparatus for detecting defects in the recovered signal; and defect compensation apparatus coupled to said demodulation apparatus and to said defect detection apparatus and responsive to the operation of the defect detection apparatus for providing a substitute signal in place of the recovered signal in the playback display of said information signals during occurrences of defects in the recovered signal; said player being subject to interference with normal playback display operations due to the pickup of unrecorded, externally applied signals; apparatus for reducing the influence of said external signals comprising:

an automatic gain controlled amplifier connected to said pickup apparatus for providing an amplified signal including components corresponding to said modulated carrier and to said external signal;

first and second conductive paths connected to an output terminal of said amplifier, said first path including a signal limiter, said limiter providing an output signal including components corresponding to said modulated carrier, said external signal and a further signal symmetrically disposed about said carrier in frequency relative to said carrier signal and said external component;

a product generator circuit connected to an output terminal of said limiter and to said second path for providing an output signal comprising components resulting from the product of the signals on the second path and the output signals from said limiter;

filter means connected to said product generator for confining the signal components from said product generator to a certain frequency region;

signal detector means connected to said filter means for providing an output signal indicative of the influence of said external signal in said certain frequency region; and means for coupling the output signal from said detector means to said defect compensation apparatus.

7. The apparatus according to claim 6 wherein said product generator circuit comprises a synchronous detector.

8. The apparatus according to claim 7 wherein said signal detector means comprises a peak detector.

9. The apparatus according to claim 7 wherein said signal detector means comprises a square law detector.

* * * * *